No. 889,695. PATENTED JUNE 2, 1908.
F. W. LECHNER.
WHEEL RETAINER AND ATTACHMENT SUPPORT.
APPLICATION FILED JAN. 8, 1908.
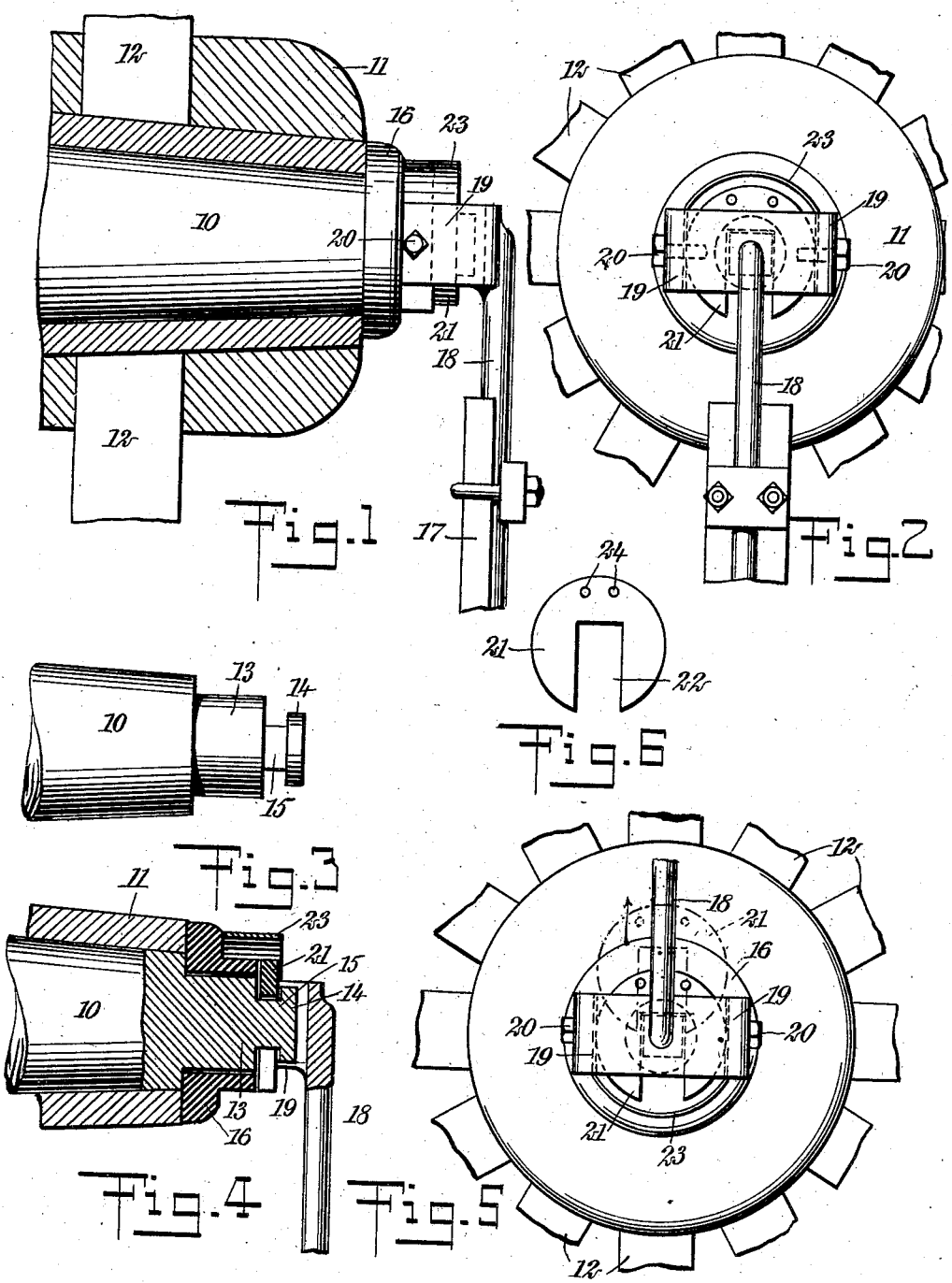
WITNESSES
INVENTOR
Frederick W. Lechner
BY
ATTORNEYS.

UNITED STATES PATENT OFFICE.

FREDERICK W. LECHNER, OF WENONA, ILLINOIS.

WHEEL-RETAINER AND ATTACHMENT-SUPPORT.

No. 889,695.     Specification of Letters Patent.     Patented June 2, 1908.

Application filed January 8, 1908. Serial No. 409,863.

*To all whom it may concern:*

Be it known that I, FREDERICK W. LECHNER, a citizen of the United States, and a resident of Wenona, in the county of Marshall and State of Illinois, have invented a new and Improved Wheel-Retainer and Attachment-Support, of which the following is a full, clear, and exact description.

This invention relates to certain improvements in that type of device which is adapted to be attached to the end of an axle or shaft for retaining a wheel in position and also adapted to constitute a support for any suitable form of attachment or mechanism.

More particularly, my invention relates to certain improvements in the mechanism disclosed in my previous patent No. 848,472, granted March 26, 1907, and involves means for retaining the wagon wheel upon the axle and supporting a road-smoothing device.

I have discovered that the threads on the axle and on the nut serving to retain the wheel in position, become worn by the constant use of my road-smoothing device, due to the constant oscillation of the nut as the device passes over rough roads. To avoid this objection and also to facilitate the removal of the attachment and the wheel, I provide a collar and key mechanism, so constructed that with the device attached, the key cannot possibly be removed or the collar loosened, but upon the removal of the road-smoothing device, a half revolution of the collar serves to liberate the key and permit its removal, as well as the removal of the collar and wheel.

Reference is to be had to the accompanying drawings, forming a part of this specification, in which similar characters of reference indicate corresponding parts in all the figures, and in which Figure 1 is a longitudinal section through a portion of a wheel, showing my improved mechanism attached to the end of the axle; Fig. 2 is an end view thereof, showing the parts in normal or working condition; Fig. 3 is a side elevation of the axle; Fig. 4 is a vertical section through the end of the axle, the key and the collar; Fig. 5 is an end view similar to Fig. 2, but showing the parts in the position to permit of a removal of the key; Fig. 6 is a view of the key; and Fig. 7 is a simple form of key lifter which may be employed if desired.

I have illustrated my improved device as applied to an axle 10, having a wheel mounted thereon and including a hub 11 and spokes 12. The end of the axle instead of being threaded for the reception of a nut, is formed with a cylindrical portion 13 for the reception of a collar, and beyond the cylindrical portion or stud is a head 14 separated from the cylindrical portion of the stud by a reduced connecting portion 15, preferably rectangular in cross-section and forming upon opposite sides thereof and between the head and the cylindrical portion of the stud, a keyway for the reception of a key which holds the collar in position. A collar 16 fits upon the stud 13 and engages with the end of the hub for retaining the latter upon the axle. The collar is of a length substantially equal to the body portion of the stud, and extends outwardly from the hub to the keyway. The arm 17 of the road-smoothing device is provided with a separable section 18, forming a handle, and this handle carries oppositely-disposed yoke arms 19, which are rigidly secured to the opposite sides of the collar 16 in any suitable manner, as, for instance, by set screws 20. The handle may be secured to the other section of the depending arm 17 in any suitable manner, but is preferably so connected that it may be readily detached therefrom. The weight of the smoothing device normally holds the arm in a depending position, substantially as shown in Fig. 2, but upon detaching the handle 18 from the remainder of the arm, said handle may be moved to a vertical position as illustrated in Fig. 5. A key 21 is provided substantially as shown in Fig. 6, said key being of a thickness substantially equal to the distance between the head 14 and the body 13 of the stud, and has a groove 22 extending into one side thereof for the reception of the connecting portion 15. The collar and handle 18 carry a key-retainer in the form of a curved plate 23, extending from one yoke arm 19 to the other and extending outwardly from the collar over the space occupied by the key, as shown in Figs. 1 and 4.

With the parts in the position shown in Fig. 2, the key cannot be raised by reason of the key-retaining plate 23, but with the parts moved to the position shown in Fig. 5, the key-retainer comes beneath the key and the key may be readily raised and removed, as illustrated in dotted lines in said figure. If desired, the key may be provided with one or more small apertures 24 in the side thereof opposite to the groove 22, and a key-lifter or remover substantially as shown in Fig. 7, may be employed. As here illustrated, the key-lifter embodies a loop portion 25 adapted to slip over the end of the handle 18, and at one side of the loop is a pin portion 26 adapted for insertion in one of the openings 24, and at the opposite side of the loop is a handle portion 27.

By detaching the handle 18 from the remainder of the arm, moving it to the upright position shown in Fig. 5, slipping the key-lifter down over the end of the arm, and inserting the pin end 26 in one of the openings 24, the handle portion 27 of the lifter may be depressed to lift the key, so that it may be more readily taken hold of and removed. As soon as the key is removed, the collar may be slipped off the stud and the wheel removed from the axle.

In case it is desired to employ my wheel retainer independently of a road-smoothing device, or other attachment, the arm 17 may be omitted and the handle 18 formed of sufficient width to retain the latter in a normally depending position.

Having thus described my invention, I claim as new and desire to secure by Letters Patent:

1. In combination, an axle, a wheel mounted thereon, a wheel-retaining collar on said axle, a key for retaining the collar, means carried by said collar for normally retaining the key, and a normally depending arm or handle carried by said collar.

2. In combination, an axle, a collar mounted thereon, a key in engagement with said axle adjacent to the end of the collar and serving to retain the collar in position, a depending arm or handle carried by said collar and normally preventing rotation thereof, and means carried by said collar for preventing the removal of said key, save when said arm or handle and said collar are rotated to bring the former in a substantially upright position.

3. In combination, an axle, a collar on said axle, a vertically-movable key in engagement with said axle adjacent to the end thereof and serving to retain said collar, a key-retaining plate carried by said collar and normally adjacent to the upper end of said key, and a depending arm or handle carried by said collar and normally preventing the rotation thereof, said key being removable only when said arm or handle is raised to a substantially upright position.

4. In combination, an axle, a collar mounted thereon, a vertically-movable key in engagement with said axle, adjacent to the end thereof and serving to retain said collar, means carried by said collar and extending outwardly above the end of the key for normally preventing the vertical movement thereof, and means carried by said collar for normally preventing the rotation thereof, said collar being removable by rotating the same to bring the key-retaining means out of its normal position above said key.

In testimony whereof I have signed my name to this specification in the presence of two subscribing witnesses.

FREDERICK W. LECHNER.

Witnesses:
  A. J. WINTER,
  JENNIE WOLFE.